UNITED STATES PATENT OFFICE.

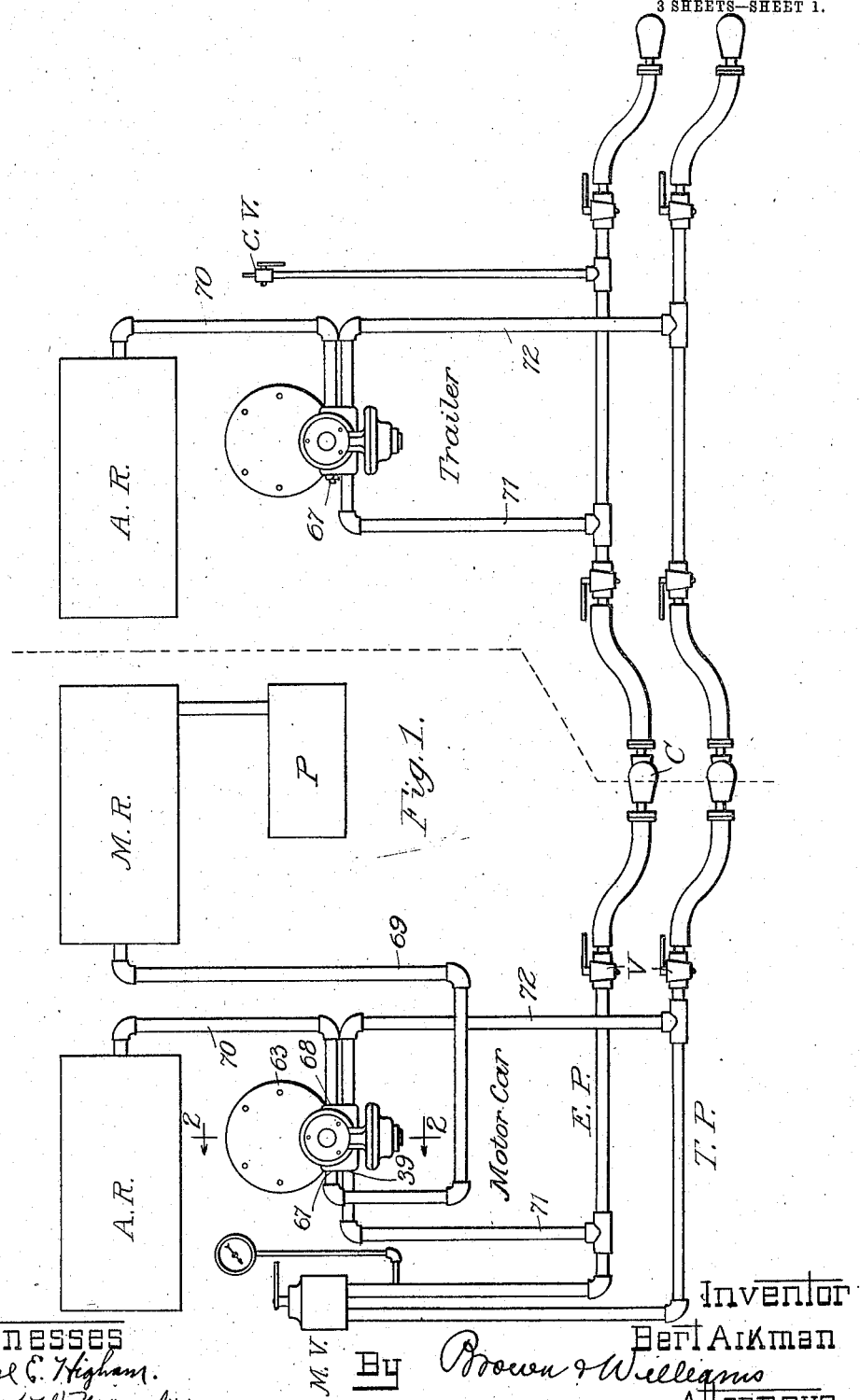

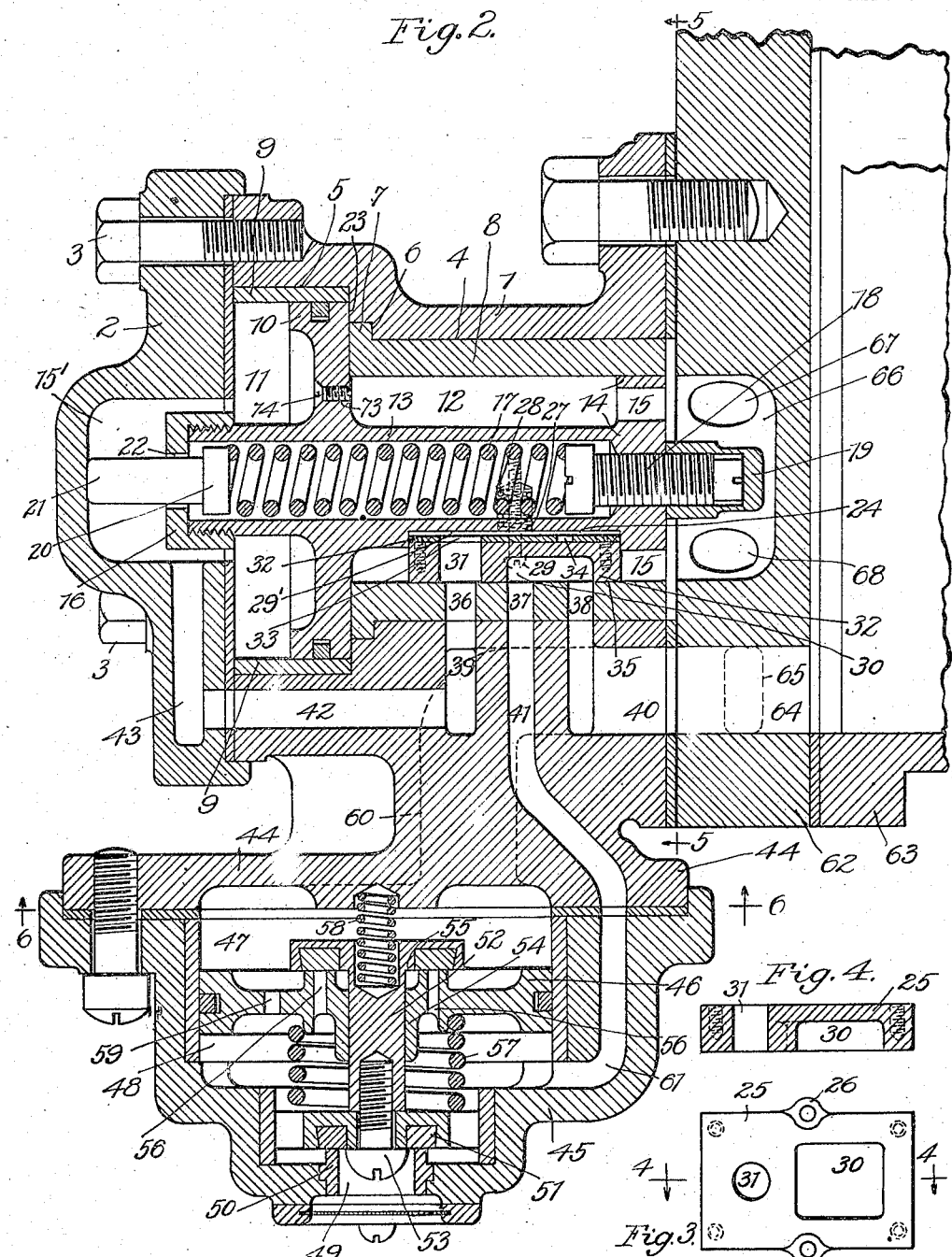

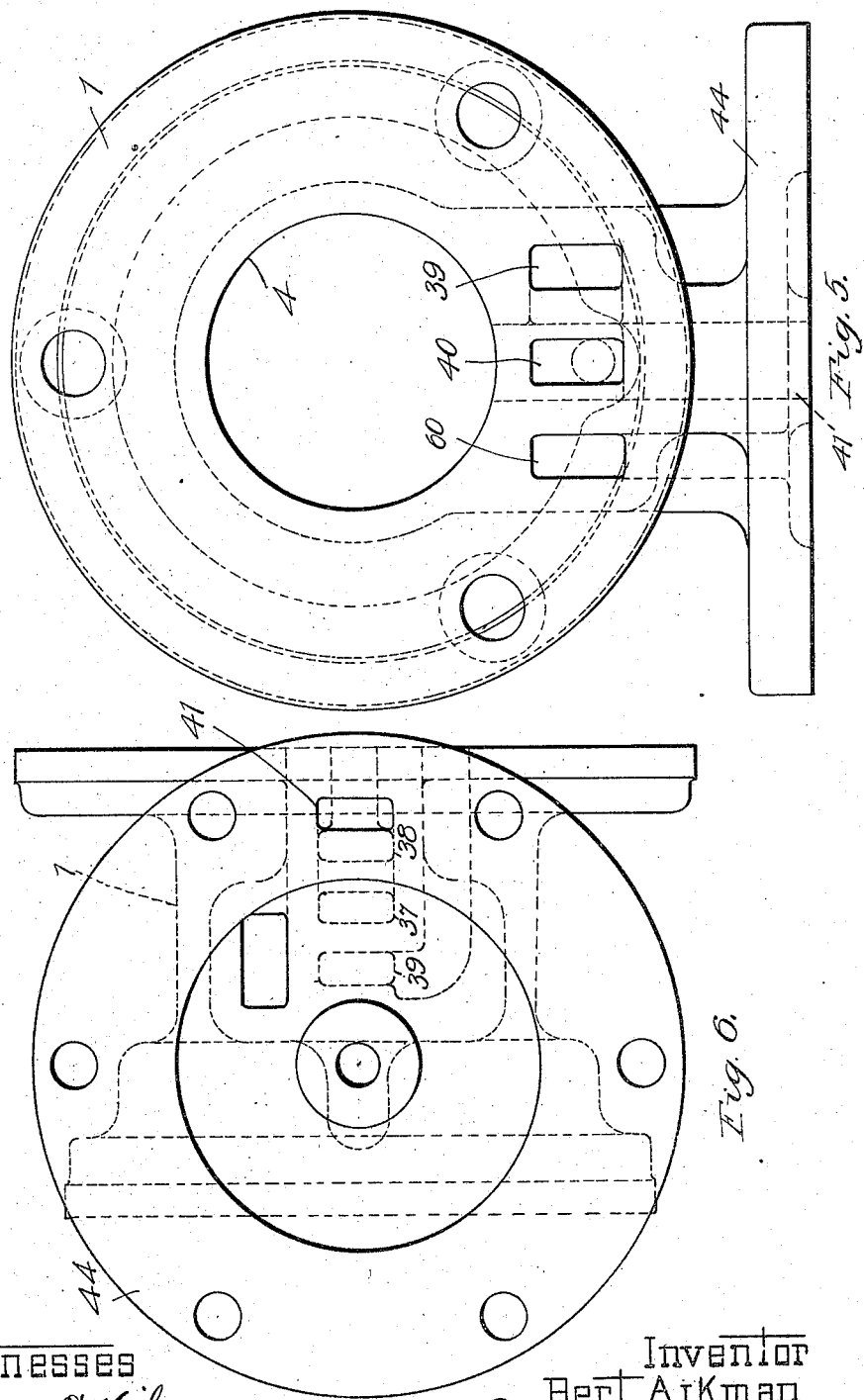

BERT AIKMAN, OF CHICAGO, ILLINOIS, ASSIGNOR TO NATIONAL BRAKE AND ELECTRIC COMPANY, OF MILWAUKEE, WISCONSIN, A CORPORATION OF WISCONSIN.

AIR-BRAKE SYSTEM.

No. 900,639.

Specification of Letters Patent.

Patented Oct. 6, 1908.

Application filed December 9, 1907. Serial No. 405,632.

*To all whom it may concern:*

Be it known that I, BERT AIKMAN, citizen of the United States, residing at Chicago, in the county of Cook and State of Illinois, have invented a certain new and useful Improvement in Air-Brake Systems, of which the following is a full, clear, concise, and exact description, reference being had to the accompanying drawings, forming a part of this specification.

My invention relates to automatic air brake systems, its object being to provide for improved and more simple and efficient operation thereof.

In my co-pending application Serial No. 338,930, filed October 15, 1906, I have described an air brake system in which auxiliary reservoirs are employed and in which triple valve mechanisms are utilized for connecting the auxiliary reservoirs with the brake cylinders, an emergency pipe being employed, adapted for connection with atmosphere and connected with the triple valve mechanism to cause operation thereof to connect the auxiliary reservoirs directly with the brake cylinders when emergency braking is desired. The train pipe is connected with atmosphere in multiple with the emergency pipe upon emergency braking, and insures quick action of the triple valve mechanism to cause a connection of the auxiliary reservoirs with the brake cylinders. In this system, however, a special valve is necessary to connect the emergency pipe with atmosphere, and there is no provision made for allowing quick and local release of the brake cylinders.

The main object of my present invention is to rearrange the piping control so that the motorman's valve may serve as a common means for making all connections desired and to provide quick release mechanism which will allow rapid, local release of the brake cylinders and brakes controlled thereby. It is just as important, sometimes, to quickly release the brakes after sudden setting thereof, as it is to suddenly set the brakes, and the importance of this quick release feature is therefore apparent.

On the accompanying drawings which illustrate my present invention Figure 1 is a diagrammatic view showing the various parts of the system and the connections therefor; Fig. 2 is an enlarged sectional view taken on line 2—2 of Fig. 1; Fig. 3 is a bottom view of the main valve; Fig. 4 is a sectional view taken on line 4—4 of Fig. 3; Fig. 5 is a view taken on plane 5—5 of Fig. 2 with the quick release valve frame removed; and Fig. 6 is a view taken on plane 6—6 of Fig. 2.

The valve frame comprises the body part or shell 1, substantially cylindrical in form, and the cap 2 secured thereto by bolts 3. The body part has the cylindrical bore 4 which extends throughout the greater part thereof, and the larger bore 5 at the left end. Between these bores is the shoulder 6 which receives the flange 7 of the bushing 8 of brass or other suitable material which lines the bore 4. The bore 5 is lined with a bushing 9, and within this bushing is disposed the valve piston 10. which divides the valve frame into the left chamber 11 and the right chamber 12. The piston carries the hollow hub or sleeve 13, which extends through the chamber 12 and terminates at its right end in the guiding flange 14, having the port passageways 15. The left end of the sleeve 13 extends through chamber 11 into the chamber 15' formed in the cap 2, this end of the sleeve being engaged by a cap 16. Within the hub or sleeve is a spring 17, whose one end rests against the adjustable abutment 18 in the form of a screw threading through the flange 14, as shown, the end of the screw being engaged by a locking cap 19. The other end of the spring engages the head 20 of the abutment rod 21, which passes through the opening 22 in the cap 16 and abuts against the outer wall of chamber 15'. This spring is always under compression, and therefore the tendency is to hold the piston to the right in engagement with the left end of bushing 8 and the ledge or seat 23. The sleeve 13 has a pocket 24 with a flat base, in which pocket is held the rectangular main valve 25. This valve has ears or lugs 26 at its sides, which register with pockets 27 formed in the sides of the sleeve 13. In each pocket is a compression spring 28 and screws 29 passing through the ears 26, through the springs, and in engagement with the metal of the sleeve 13, hold the main valve yieldingly within the pocket against the compression of the springs, the valve, however, being not quite brought into engagement with the base of the pocket but separated therefrom to leave a space or bypass 29'. The main valve has the valve pocket 30 and the port 31. A rectangular plate 32 is secured to the main valve and has openings 33 and 34, which openings are interchangeable, the large opening 33 being shown in the figure to be in register with the port 31 and this is the arrangement where the valve is used on the motor car of an electric train. When the valve is used on trailers, the plate is reversed to bring the smaller passageway 34 into register with port 31. This will be referred to more fully later. The interior of bushing 8 has a flat section forming a seat 35 for the base of the main valve and from this seat ports 36, 37 and 38 lead. Port 36 connects with passageway 39 through the valve body, which passageway terminates at the right face of the valve frame body. Port 38 connects with passageway 40 through the valve frame body, which also terminates at the right face of the valve frame body. Port 37 connects with passageway 41 through the valve frame body. The passageway 39 also connects through passageway 42 with a passageway 43 in the cap 2, which passageway 43 communicates with chamber 15' and therefore with the left valve chamber 11. The valve frame body carries also a flange 44, to which is secured a quick release valve frame 45, as shown. Within this valve frame is a piston 46, which divides the interior into the upper and lower valve chambers 47 and 48.

Through the lower wall of the quick release valve frame is the outlet opening 49, lining which is a cylindrical valve seat 50 normally engaged by the valve 51. This valve is secured to a stem 52 by means of screw 53, and passes through the hub 54 of the piston 46 and terminates at its upper end in a valve 55 which normally closes bypasses 56 through the piston. A compression spring 57 intervenes between the lower valve 51 and the piston, and tends to hold the piston against the upper valve 55 to keep the bypasses 56 closed. The compression spring 58 intervenes between the valve stem 52 and the flange 44, which forms the top wall of the quick release valve upper chamber. Through the piston 46 is a restricted passageway 59 which is permanently open. When the piston 46 is raised the valve stem 52 and the valves thereon are raised therewith, and valve 51 removed from seat 50, thereby opening communication between the lower valve chamber 48 and the outlet 49. The upper chamber 47 communicates with passageway 60, which leads through the valve frame body 1 and terminates at the right face thereof, the passageways 39, 40 and 60 terminating in a row, as shown in Fig. 5. Passageway 61 through the quick release valve frame registers with passageway 41, connecting with port 37 as before described, this passageway 61 leading to the lower release valve chamber 48.

For the purpose of affording connecting means from the passageways 39, 40 and 60, to apparatus of the system, a connecting head 62 is secured against the outlet face of the valve body 1, as shown, this head being in turn preferably directly secured to the end of the brake cylinder 63, as shown in Fig. 1. Through this connecting head is a passageway 64, which connects passageway 40 directly with the brake cylinder. A passageway 65 through the connecting head connects with passageway 39, while a similar passageway through the connecting head will connect passageway 60 with the exterior. A chamber 66 is formed in the head 62 for receiving the locking cap 19, and passageways 67 and 68 through the connecting head terminate in this chamber, this chamber having preferably the same diameter as the right valve chamber 12. The various passageways through the connecting head may be readily adapted for connection with piping.

Referring to Fig. 1, passageway 67 is connected with the main reservoir MR through piping 69. Passageway 68 connects with the auxiliary reservoir AR through piping 70. Passageway 39 connects with emergency pipe EP through piping 71. Passageway 65 connects with train pipe TP through piping 72, this connection being for the motor car equipment shown to the left of the dotted line in Fig. 1. For the trailers, the connection is as shown to the right of the dotted line, there being only the auxiliary reservoir, passageway 67 being plugged; the other connections, however, being the same.

MV represents the motorman's valve with which the emergency pipe and the train pipe are connected. The construction of this motorman's valve is not shown, but its operation may be such that the train pipe is normally connected with atmosphere and the emergency pipe closed, and that the emergency pipe can be connected with the train pipe or both emergency and train pipes opened to atmosphere.

P represents a pump for supplying compressed air to the main reservoir.

CV represents a conductor's valve connected with the emergency pipe.

V represents the coupling valves, and C represents the couplings for coupling together the pipe sections of the cars of a train. Through the main piston of each triple valve mechanism there is a restricted port opening 73, which on the motor car is open, but which on the trailers is plugged as by means of a screw 74.

The operation of the system can be readily understood from the drawings. The pump supplies compressed air to the main reservoir, and this compressed air flows through piping 69, through passageway 67, into chamber 66, through port openings 15 into the right valve chamber 12 of the motor car triple valve, thence through the bypass 29', through registering ports 31 and 36, into passageway 39, part of the air flowing through passageways 42 and 43 into the left valve chamber to equalize the pressure in the valve chambers, the remaining air flowing through passageway 39, through piping 71 and through the emergency pipe to the trailers, the compressed air in each trailer flowing through piping 71 into passageway 39 into both valve chambers, namely through passageways 42 and 43 to the left valve chamber and through ports 36 and 31 and the bypass 29' into the right valve chamber, the air passing from the right valve chamber through port openings 15 and through passageway 68 into piping 70, and eventually into the auxiliary reservoir. The auxiliary reservoirs of the trailers are thus supplied by way of the emergency pipe. At the motor car, however, the auxiliary reservoir is supplied directly from the main reservoir, the connection being from passageway 67, through chamber 66, and through piping 68. Suppose the train is running, and the motorman desires to apply the brakes in the ordinary manner. He actuates the motorman's valve to connect the emergency pipe with the train pipe, whereupon air will flow from the main reservoir through piping 69, passageway 67, right valve chamber 12, ports 31, 36, passageway 39, to piping 71, to emergency pipe through the motorman's valve to the train pipe, through piping 72, through passageways 60 into upper release valve chamber 47, through port 59, to lower release valve chamber 48, through passageways 61 and 41, port 37, main valve compartment 30, port 38 and passageways 40 and 64 into the brake cylinders, and the brakes will be applied. If the motorman laps the motorman's valve gradually, the port 59 through the quick release valve will be of sufficient area to accommodate the flow of air, but if the motorman's valve is suddenly opened wide, this part 59 will not be able to carry the entire air flow, and consequently there will be an accumulation of pressure in the upper valve chamber 47, and the valve piston 54 will be depressed, thus opening auxiliary passageways 56 through the piston and sufficient passageway will be offered to the air flow. As the pressure diminishes, piston 55 again resumes its normal position to again close passageways 56. To release the brakes the motorman's valve is moved toward its normal position to close the emergency pipe and to reconnect the train pipe with atmosphere. The brake cylinders now exhaust through passageways 64, 40, port 38, main valve pocket 30, port 37, passageways 41 and 61, into the lower release valve chamber 48. If the motorman's valve is actuated to gradually connect the train pipe with atmosphere, this exhaust air from the brake cylinders will find sufficient passageway through the ports 59 into the upper valve chambers 47 and will then flow through the passageways 60 to the train pipe and to atmosphere, the brakes being released. If the motorman's valve, however, is actuated to suddenly open wide the connection of the train pipe with atmosphere, the exhaust air from the brake cylinders will not have sufficient passageway through ports 59, and there will be an accumulation of pressure in the lower valve-chambers 48 and consequently the quick release pistons 54 will be raised and the valves 51 carried from their seats 50, thus affording each car a direct release outlet from the lower valve chamber 48 through the out-let 49. Thus the quick release valves offer local direct exhaust paths for the various cars of a train, thereby assuring quick release of the brakes. As already shown, the release valves also allow quick flow of reservoir air into the various brake cylinders to assure quick response of the brake cylinders and operation of the brake.

The setting of the brakes is sufficiently rapid under normal conditions of operation by connecting the emergency pipe to the train pipe, as before described, but sometimes emergencies arise when the brakes must be applied almost instantaneously. When this occasion arises, the motorman's valve is actuated to connect the emergency pipe with atmosphere. As the left valve chambers 11 of the various triple valve mechanisms are all connected with the emergency pipe, the connection of the emergency pipe with atmosphere will cause a sudden reduction of the pressure in the left valve chambers, and the pressures on the main piston 10 will become unbalanced and these pistons will be thrown to the left, the main valve 25 in its new position connecting ports 36 and 37 and exposing port 38 to the chamber 66. In the motor car, therefore, both the main and auxiliary reservoirs are directly connected with the brake cylinder through the port 38 and passageways 40 and 64, while at the trailers the auxiliary reservoirs are connected directly with the brake cylinders, and the brakes instantly applied. As soon as the valve pocket 30 begins to connect ports 36 and 37, another path is afforded each left valve chamber 11 to atmosphere, namely, through passageways 43, 42, port 36, valve pocket 30, port 37, passageways 41, 61, lower release valve chamber 48, and through local outlet 49, the release valve being unbalanced upon the sudden rush of air under pressure into the lower chamber 48. Thus a common path and a local path to atmosphere are provided for suddenly reducing the pressure in the chambers 11, the result being that the main pistons 10 are very quickly actuated to move the main valves to cause very quick connection of the brake cylinders directly with the sources of power and the brakes are almost instantly set to brake the train. In the motor car, the bypass 73 is open, but this opening is sufficiently restricted so that the leakage therethrough to atmosphere from the right chamber 12 and from the reservoirs will have no effect on the braking as the pump, which is operating, will maintain the pressure in the reservoir against the leakage. After the train has been sufficiently stopped, the motorman's valve is actuated to shut off the connection of the emergency pipe and train pipe to atmosphere.

The left valve chambers of the triple valves are therefore disconnected from atmosphere, and on the motor car air from the reservoir flows from the right valve chamber through the bypass 73, to the left valve chamber 11, and then into passageways 43 and 42 and through passageways 39 to piping 71 and to the emergency pipe. Air also flows through the valve pocket 30 into passageways 41, through chambers 48 and 47 and through passageways 60 and 65 to the train pipe. At the trailers there can be no equalization through the bypasses 73 as these bypasses are plugged. When the emergency pipe and train pipe are closed, the air flowing into the emergency pipe and train pipe, as traced, will eventually flow into the left chambers 11 of the trailer valves. As soon as the pressure in the motor valve chamber 11 plus the force of spring 17 begins to equal the pressure in chamber 12, the motor valve moves towards its normal position. The valves at the trailers also start to restore but as soon as the motor valve is restored far enough to re-connect port 31 with passageway 39, air flows directly from the motor valve chambers 12 to 39, and through the emergency pipe to the chambers 11 of the trailer valves, thus causing the valves to quickly restore. This initially retarded restoring movement of the valves allows the pressure in the emergency pipe and train pipe to come practically to reservoir pressure before the brake cylinders exhaust into the train pipe and thus the brakes will not be prematurely released. The valves having been restored to normal position, the brakes can be released by re-opening of the train pipe to atmosphere whereupon the air will exhaust from the brake cylinders through passageways 40 and through the valve 32 to train pipe and to atmosphere and this release of the brakes can be accomplished gradually or suddenly, depending upon the operation of the motorman's valve.

If the valve is operated normally and the train pipe gradually connected with atmosphere, the air from all the brake cylinders will flow through the quick release valve chambers into the train pipe, and thence to atmosphere. If the train pipe, however, is suddenly connected wide with atmosphere, the automatic release valve will be raised and each brake cylinder exhausted locally directly to the atmosphere through the corresponding exhaust outlet 49. When the apparatus, therefore, is in operative condition, the train can be braked either gradually or quite rapidly, and the release thereafter can be controlled to be gradual or very quick. Upon emergency the train can be braked instantly and the release thereafter can also be gradual or quick. Emergency braking will also take place automatically upon accident. For instance, in the case of uncoupling between any of the cars of the train, the couplings connecting the sections of the emergency pipe and train pipe will be broken and these lines opened. This, of course, immediately causes unbalancing of the main pistons and therefore direct connection of the reservoirs with the brake cylinders, causing the train to be immediately braked. The conductor's valve at the rear end of the train is connected with the emergency pipe, and opening of this valve to connect the emergency pipe with atmosphere of course also causes unbalancing of the valves and braking of the train. Piping 69 connecting the main reservoir with the triple valve in the motor car might break. If this happens the emergency pipe will connect with the atmosphere through ports 36 and 31, through motor valve chamber 12 and through piping 69, and all chambers 11 of the trailer valves are then connected with atmosphere and the valves unbalanced to cause setting of the brakes by air from the auxiliary reservoir. Chamber 11 of the motor valve also connects with atmosphere through the emergency pipe and also through bypass 73. Both chambers 11 and 12 of the motor valve being thus connected with atmosphere there will be no unbalancing of the valve and consequently the motor car will not be braked. The auxiliary reservoir on the motor car of course also exhausts through the break in piping 69.

If the train pipe should open or break at any point and the motorman tries to stop the train, the air from the main reservoir would pass from the emergency pipe through the train pipe to atmosphere, and the brakes would not operate, and he would therefore immediately connect the emergency pipe with atmosphere to throw the emergency brakes. Suppose that on a trailer the piping 70 connecting the auxiliary reservoir of the triple valve should break or be opened to atmosphere. The emergency pipe will then connect with atmosphere through the ports 36, 31, passageway 34, right valve chamber 12, ports 15, passageway 68 and through pipe 70. The valves on all the other cars will be actuated to connect their brake cylinders directly with reservoirs and the train will be stopped, although there will be no air available for emergency braking at the trailer at which piping 70 is damaged, but this trailer may be braked by straight air as the pump can maintain braking pressure against the leak through passageway 34 which is sufficiently restricted. The connections, however, between the reservoirs and triple valve mechanisms can be made very short and can be put in protected places, there being then little likelihood of injury thereto. After any automatic emergency operation of the brakes, they can be released in the manner as has been described, after the break or injury has been repaired.

Referring back again to plate 32 on the main valve 25, this plate on the valve on the motor car is placed with its port 33 in register with valve port 31, as a greater area must be provided here for reservoir air which flows into the emergency pipe to be distributed to the various auxiliary reservoirs, and as each auxiliary reservoir takes only a part of this air supply, the area through the triple valve need not be so large, and consequently at the trailers the plate 32 is reversed to bring the smaller passageway 34 into register with port 31, the utility of this being realized in the case of breaking of a pipe 70 or leak from an auxiliary reservoir.

The system of my invention having thus been described, it will be seen that the mechanism is a very simple and efficient construction, and the amount of piping and controlling valve mechanism in minimum, only two pipes running the full length of the train being necessary and all positions and air flows being controlled by a single motorman's valve.

Having thus described my invention, I claim as new and desire to secure by Letters Patent:

1. In an automatic braking system, the combination of a main reservoir, a plurality of auxiliary reservoirs, a brake cylinder associated with each auxiliary reservoir, an emergency pipe, a train pipe, a motorman's valve, connections between the valve mechanisms and the other members enumerated, said valve mechanisms being normally balanced and arranged to connect the main reservoir with the emergency pipe and the emergency pipe with the auxiliary reservoirs whereby said auxiliary reservoirs are charged, said valve mechanisms also normally connecting brake cylinders with the train pipe and said motorman's valve normally connecting said train pipe with atmosphere and closing the emergency pipe, actuation of the motorman's valve to connect the emergency pipe with atmosphere causing unbalancing of the valve mechanisms to disconnect the main reservoir from the emergency pipe and to connect the brake cylinders directly with the auxiliary reservoirs, and local means at each valve mechanism for assisting in the unbalancing thereof to cause more rapid connection of the brake cylinders with the auxiliary reservoirs.

2. In an automatic braking system, the combination of a main reservoir, means for maintaining pressure in said main reservoir, an auxiliary reservoir, a brake cylinder, an emergency pipe, a valve controlling said emergency pipe, a main valve connected with the main reservoir and with the auxiliary reservoir and the emergency pipe, a piston controlling the operation of said main valve, the pressure at the sides of said piston being normally equal and the valve mechanism being normally disposed to cause connection of the main reservoir and the auxiliary reservoir with the emergency pipe, opening of the emergency pipe to atmosphere upon actuation of the controlling valve causing reduction of pressure at one side of the piston whereby the main valve is moved to disconnect the main reservoir and auxiliary reservoir from the emergency pipe and to connect the auxiliary reservoir directly with the brake cylinder.

3. In an automatic braking system, the combination of a main reservoir, means for maintaining pressure in said main reservoir, an auxiliary reservoir, a brake cylinder, an emergency pipe, a valve controlling said emergency pipe, a main valve connected with the main reservoir and with the auxiliary reservoir and the emergency pipe, a piston controlling the operation of said main valve, the pressure at the sides of said piston being normally equal and the valve mechanism being normally disposed to cause connection of the main reservoir with the auxiliary reservoir with the emergency pipe, opening of the emergency pipe to atmosphere upon actuation of the controlling valve causing reduction of pressure at one side of the piston whereby the main valve is moved to disconnect the main reservoir and auxiliary reservoir from the emergency pipe and to connect the auxiliary reservoir directly with the brake cylinder, and means independent of the emergency pipe for causing direct connection to atmosphere from the one side of the piston whereby quick actuation of the main valve and quick connection of the brake cylinders and of the auxiliary reservoir are assured.

4. In an automatic braking system, the combination of a main reservoir, means for maintaining pressure in said main reservoir, a plurality of auxiliary reservoirs, a brake cylinder associated with each auxiliary reservoir, a main valve mechanism associated with each brake cylinder and connected with the associated auxiliary reservoir, a main valve for the main valve mechanism and a piston controlling the operation of said main valve, an emergency pipe connecting with the various main valve mechanisms, a train pipe connecting with the various main valve mechanisms, a motorman's valve controlling the condition of the pipes, said main reservoir being connected with one of said main valve mechanisms, said main valve mechanisms being normally disposed to maintain equal pressure at both sides of the piston to maintain the main valve in normal position, said main valve mechanisms in their normal position connecting the auxiliary reservoirs with the emergency pipe and connecting the main reservoir with the emergency pipe, whereby said auxiliary reservoirs are normally charged from the main reservoir, said brake cylinders during the normal position of the main valve mechanisms being connected with the train pipe, said motorman's valve being normally in position to connect the train pipe with atmosphere and to close the emergency pipe, said motorman's valve being adapted to connect the emergency pipe with the train pipe whereby air under reservoir pressure may flow from the emergency pipe into the train pipe and through the various main valve mechanisms into the brake cylinders, and means for actuating the motorman's valve to connect the emergency pipe with atmosphere whereby to connect one side of the piston with atmosphere to thereby cause unbalancing of the piston and movement of the main valve, movement of the main valves causing disconnection of the main reservoir from the emergency pipe and direct connection of the auxiliary reservoirs with the brake cylinders.

5. In an automatic braking system, the combination of a main reservoir, means for maintaining pressure in said main reservoir, a plurality of auxiliary reservoirs, a brake cylinder associated with each auxiliary reservoir, a main valve mechanism associated with each brake cylinder and connected with the associated auxiliary reservoir, a main valve for the main valve mechanism and a piston controlling the operation of said main valve, an emergency pipe connecting with the various main valve mechanisms, a train pipe connecting with the various main valve mechanisms, a motorman's valve controlling the condition of the pipes, said main reservoir being connected with one of said main valve mechanisms, said main valve mechanisms being normally disposed to maintain equal pressure at both sides of the piston to maintain the main valve in normal position, said main valve mechanisms in their normal position connecting the auxiliary reservoirs with the emergency pipe and connecting the main reservoir with the emergency pipe, whereby said auxiliary reservoirs are normally charged from the main reservoir, said brake cylinders during the normal position of the main valve mechanisms being connected with the train pipe, said motorman's valve being normally in position to connect the train pipe with atmosphere and to close the emergency pipe, said motorman's valve being adapted to connect the emergency pipe with the train pipe whereby air under reservoir pressure may flow from the emergency pipe into the train pipe and through the various main valve mechanisms into the brake cylinders, means for actuating the motorman's valve to connect the emergency pipe with atmosphere whereby to connect one side of the piston with atmosphere to thereby cause unbalancing of the piston and movement of the main valve, movement of the main valves causing disconnection of the main reservoir from the emergency pipe and direct connection of the auxiliary reservoirs with the brake cylinders, and local means at each valve mechanism for directly connecting the side of the piston with atmosphere.

6. In an automatic braking system, the combination of an auxiliary reservoir, a brake cylinder, a main valve mechanism interposed between the auxiliary reservoir and the brake cylinder and normally disconnecting the auxiliary reservoir from the brake cylinder, a piston controlling the main valve, means for normally adjusting the pressure at the sides of the piston to maintain the main valve in normal position to disconnect the auxiliary reservoir from the brake cylinder, means for reducing the pressure at one side of the piston to cause unbalancing of the main valve and movement thereof toward another position, and a direct outlet from the side of the piston to assist in reducing the pressure and to hasten the movement of the main valve, movement of said main valve to the other position causing connection of the auxiliary reservoir with the brake cylinder.

7. In an automatic braking system, the combination of a plurality of reservoirs, a brake cylinder associated with each reservoir, main valve mechanism interposed between each auxiliary reservoir and the corresponding brake cylinder, said valve mechanism being in a normal position causing disconnection of the auxiliary reservoirs from the brake cylinders, a piston for each main valve controlling the position thereof, means for normally adjusting the pressure at each side of the pistons to retain the valves in normal position, a common normally closed outlet from one side of each piston, opening of said outlet causing reduction of pressure from the connected side of the pistons whereby said pistons are unbalanced to move the main valves to another position, and a local outlet from said side of each piston for hastening the movement of the piston and main valve, said main valves upon movement causing connection between the reservoirs and brake cylinders.

8. In an automatic braking system, the combination of a plurality of reservoirs, a brake cylinder associated with each reservoir, main valve mechanism interposed between each auxiliary reservoir and the corresponding brake cylinder, said valve mechanism being in a normal position causing disconnection of the auxiliary reservoirs from the brake cylinders, a piston for each main valve controlling the position thereof, means for normally adjusting the pressure at each side of the pistons to retain the valves in normal position, a common normally closed outlet from one side of each piston, opening of said common outlet causing a reduction of pressure from the connected side of the pistons whereby said pistons are unbalanced to move the main valves to another position, and a release valve associated with each main valve and adapted upon movement of the main valve by the piston to open a local outlet from said side of the piston whereby the movement of the piston and main valve is hastened, said valve upon movement allowing connection of the reservoirs with the brake cylinders.

9. In an automatic braking system, the combination of a plurality of reservoirs, a brake cylinder associated with each reservoir, a main valve interposed between each auxiliary reservoir and the corresponding brake cylinder, said main valves in normal position preventing connection of the reservoirs with the brake cylinders, a common exhaust pipe for the brake cylinders normally connected therewith through the main valves, a common emergency pipe connected with the main valves, reduction of pressure in said emergency pipe causing unbalancing of the main valves and movement thereof to disconnect the brake cylinders from the exhaust pipe, a local outlet for each main valve and a local release valve for controlling each outlet, said release valve being interposed between the brake cylinders and the exhaust pipe, movement of the main valve upon reduction of pressure in the emergency pipe causing said release valves to open the local outlets to assist in the unbalancing of the main valves to hasten the movement thereof, said main valves upon movement allowing connection of the reservoirs with the brake cylinders, means for restoring the main valves to their normal position to disconnect the brake cylinders from the reservoirs and to connect the brake cylinders with the release valve mechanism and the common exhaust, and means for causing the release valves to open the outlets to allow rapid local exhaust of each brake cylinder.

10. In a braking system, the combination of a valve frame, a piston frame dividing said valve frame into two compartments, a main reservoir and an auxiliary reservoir normally connected with one of said compartments, a brake cylinder normally connected with atmosphere, a normally closed outlet for the other compartment, both compartments being normally under main reservoir pressure, opening of said outlet causing unbalancing of the pressures in said compartments and movement of the piston frame, and a valve carried by the piston frame and adapted upon movement thereon to disconnect the brake cylinder from atmosphere and to connect said cylinder with the auxiliary reservoir.

11. In a braking system, the combination of a valve frame, a piston frame dividing said valve frame into two compartments, a main reservoir and an auxiliary reservoir normally connected with one of said compartments, a brake cylinder normally connected with atmosphere, a normally closed outlet for the other compartment, both compartments being normally under main reservoir pressure, opening of said outlet causing unbalancing of the pressures in said compartments and movement of the piston frame, a valve carried by the piston frame and adapted upon movement thereon to disconnect the brake cylinder from atmosphere and to connect said cylinder with the auxiliary reservoir, and an additional outlet from said other compartment opened upon movement of the piston frame.

12. In a braking system, the combination of a pressure source, a brake cylinder, means for connecting said brake cylinder with the pressure source, a comparatively long path to atmosphere from the brake cylinder, means for connecting said brake cylinder with said path, and valve mechanism included in said path and controlled by the flow of air through said path to open a short direct path to atmosphere from the brake cylinder.

In witness whereof, I hereunto subscribe my name this 4th day of December A. D., 1907.

BERT AIKMAN.

Witnesses:
CHARLES J. SCHMIDT,
GEORGE E. HIGHAM.